Figure 3:
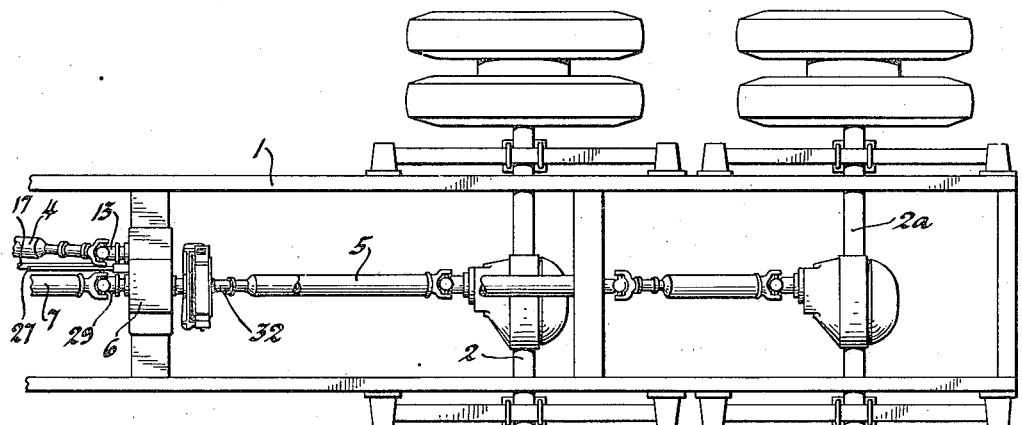

July 14, 1942. C. J. BOCK 2,290,089
FOUR WHEEL DRIVE
Filed March 11, 1941 4 Sheets-Sheet 1
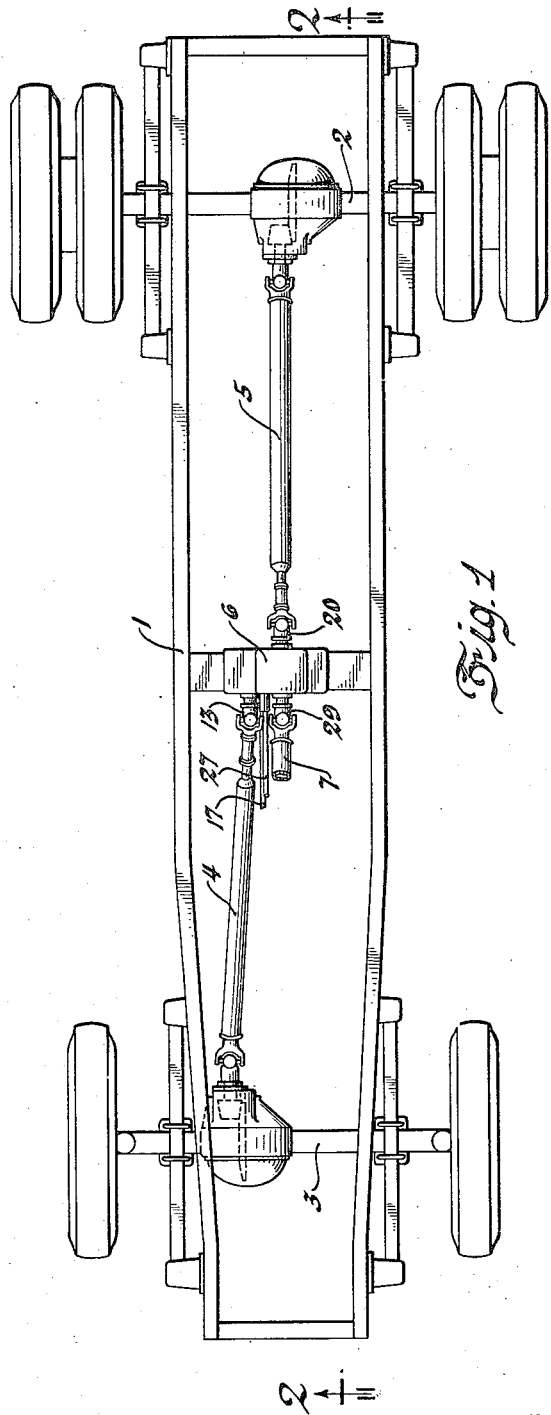
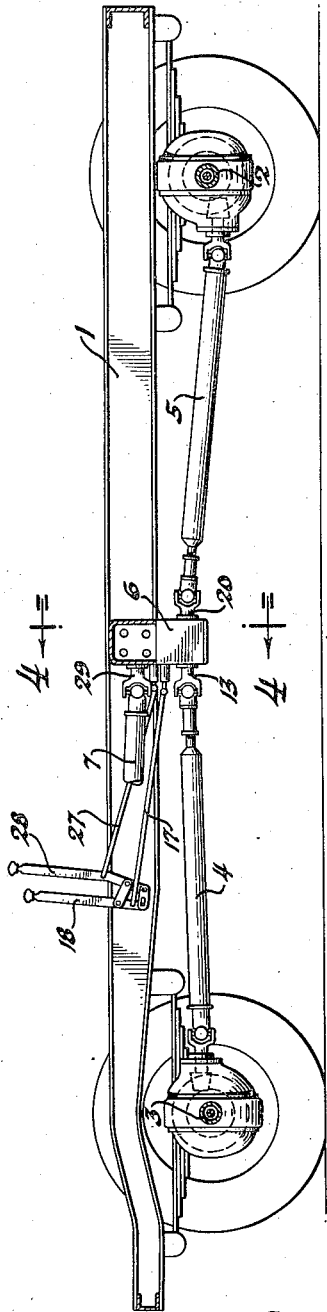
Inventor
Carl J. Bock
By Blackmore, Spencer & Flint
Attorneys

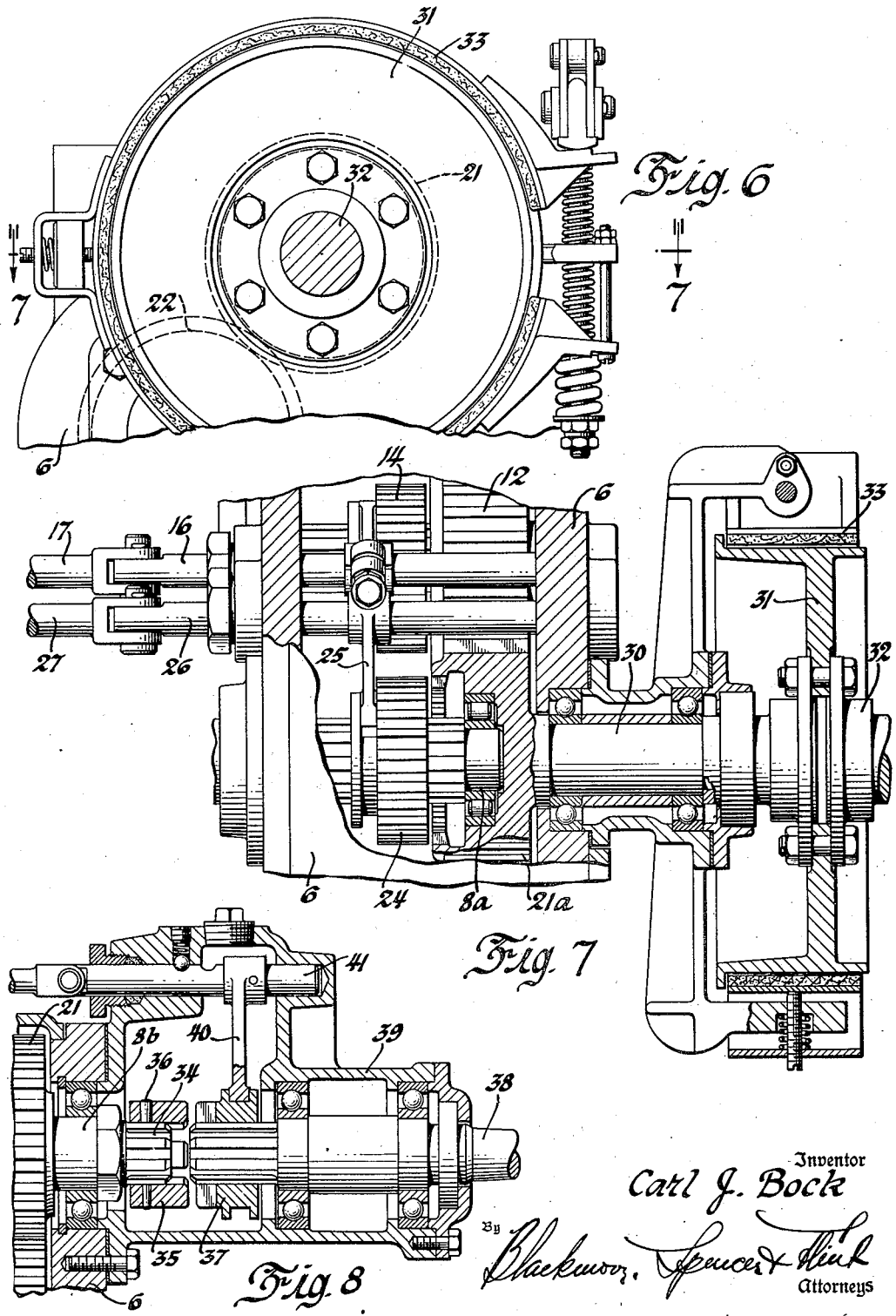

Patented July 14, 1942

2,290,089

UNITED STATES PATENT OFFICE 2,290,089

FOUR WHEEL DRIVE

Carl J. Bock, Birmingham, Mich., assignor to Yellow Truck & Coach Manufacturing Company, Pontiac, Mich., a corporation of Maine Application March 11, 1941, Serial No. 382,790

10 Claims. (Cl. 180—49)

This invention relates to multiple drive axle vehicles and more particularly to an improved mechanism through which the drive can be transmitted from the engine to all road engaging wheels.

To fill promptly the current need for special purpose vehicles of this character and to avoid manufacturing bottle necks it was deemed desirable to incorporate as many as possible of the vital parts of standard design already in use. This has other advantages, including a reduction in the amount of new tooling required, and ties in with the truck manufacturers' regular line to enable savings through larger output and more readily available supplies of service and replacement parts. In addition to the power plant a very vital part of the conventional drive mechanism of an automobile consists of the drive axle assembly. Truck axles can be used at the rear either singly for a four wheel drive or in tandem for the rear bogie of a six wheel drive vehicle and to further standardization, the same differential unit can be used in the front steering axle if arranged properly to transmit the drive.

The standard axle of at least one truck manufacturer is built with hypoid gearing in the differential ring gear and drive pinion. Hypoid gears are on non-parallel non-intersecting axes and have their teeth formed so as to be highly efficient in the transmission of drive in one direction but less efficient in the reverse direction. In other words, if the drive from the pinion is continued through the back faces of the teeth the pressure angles on the bearing surfaces build up tremendous thrust forces and cause quick wear out and complete breakdown of the gearing after relatively short life. Consequently, it is not feasible simply to use in the front axle the conventional hypoid gearing of the rear axle turned end for end in the horizontal plane and to drive the pinion in the same hand as the rear axle pinion, but the conventional gearing can be employed and properly driven in the front axle if the hypoid gears are inverted or the assembly turned through a half circle in the vertical plane and provision made for rotating the front axle pinion in the direction opposite to the normal rotation of the rear axle drive pinion.

To divide the power from the engine between the front and rear axle units it is customary to mount a transfer box on the chassis midway of its length with propeller shafts leading forward and rearwardly to the respective axle units. The engine usually is located forward in the frame directly above the front axle and for ample clearance the enlarged bowl enclosing the differential gearing in the front axle is offset transversely of the underside of the engine. The bowl of the standard rear axle is centrally disposed with its pinion shaft in the central longitudinal center line of the chassis and in the vertical plane of the engine power shaft. The shafting in the transfer box is arranged compactly but as nearly as possible, the respective shafts are axially aligned with the shafts to which they are to be connected. Proper arrangement is afforded through the use of a pair of transversely spaced output shafts in the bottom of the box geared together for relative rotation in opposite directions with the output shaft for the rear axle centrally disposed and driven through a countershaft from an input shaft centrally disposed in the top of the box. Gearing contained within the box is designed so that the drive may be transmitted in either of two speed ratios augmenting the gear setting of the conventional power plant change speed transmission and selectively to all the wheels or to the rear wheels alone.

Figure 4:
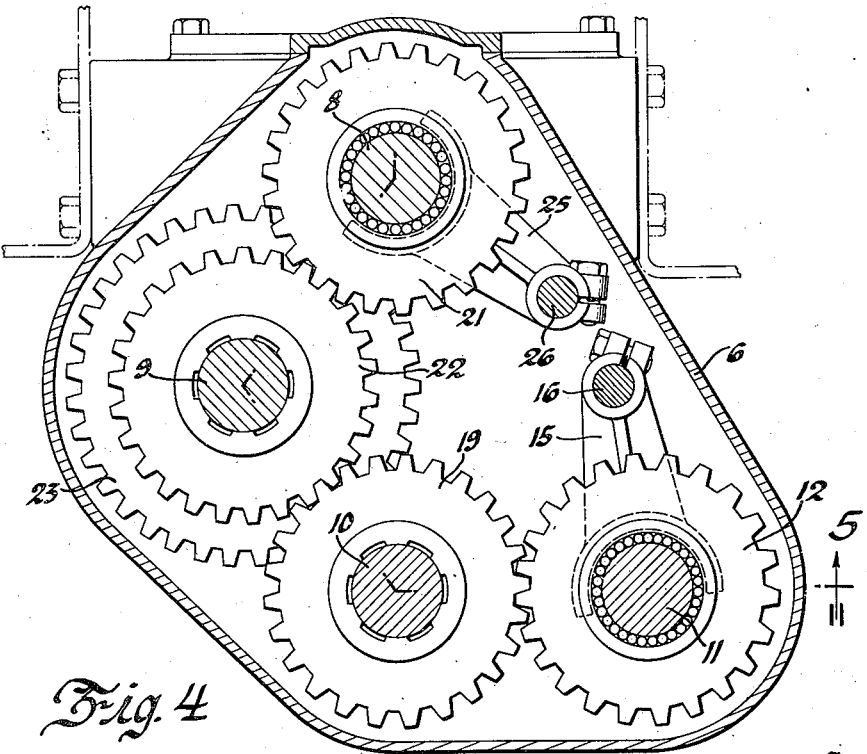
Figure 5:
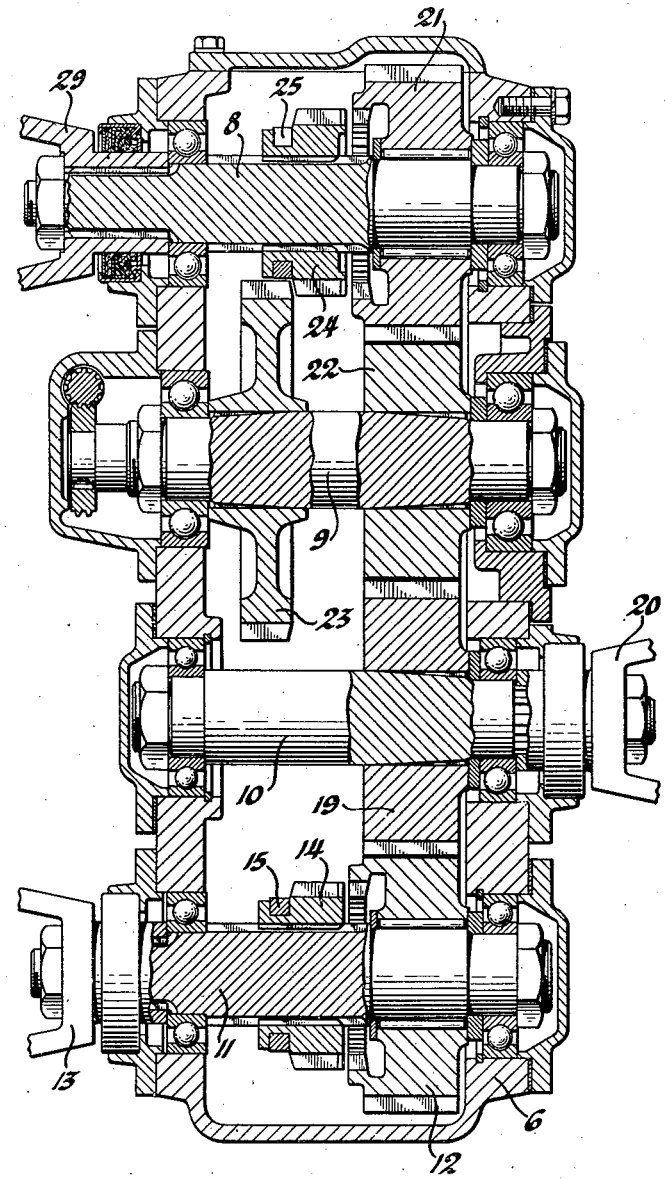

For a more detailed explanation of the invention reference will be made to the accompanying drawings wherein Figure 1 is a top plan view of the running gear of a four wheel drive vehicle with the power plant unit omitted for the sake of clarity; Figure 2 is a longitudinal vertical section taken on line 2—2 of Figure 1; Figure 3 is a top plan view of the rear portion of the running gear for a six wheel drive vehicle; Figure 4 shows the transfer box in section as on line 4—4 of Figure 2; Figure 5 is a longitudinal section through the gear box taken on the irregular line 5—5 of Figure 4; Figure 6 is a rear elevation showing a propeller shaft brake assembly; Figure 7 is a section illustrating the drive to the rearmost rear axle of a four wheel bogie; and the corresponding modification required in the gear train of the power divider mechanism, the section being taken on line 7—7 of Figure 6, and Figure 8 is a detail sectional view illustrating the application of a power take-off for a machine shop installation on a four wheel drive vehicle.

In the drawings the reference numeral 1 indicates the vehicle chassis frame, spring supported as usual upon the rear axle 2 and front steering axle 3. The rear axle illustrated is of the heavy duty type employed on standard two wheel drive vehicles and the differential ring gear and drive pinion illustrated by dotted lines is of hypoid construction with the forwardly projecting pinion shaft located substantially on the longitudinal center line of the vehicle and below the axis of the axle as seen clearly in Figure 2. Except that the front steerable wheels are swiveled on opposite ends and the bowl is offset for engine clearance, the front axle 3 is a substantial duplicate of the rear axle. It employs the same differential mechanism with hypoid pinion and ring gear as indicated in dotted lines. In this case, the rearwardly projecting pinion shaft is above the axis of the axle or in other words the front axle is rotated about its axis through 180° in relation to the position of the parts in the rear axle.

Universally jointed propeller shafts 4 and 5 connect the front and rear axles to a pair of power output shafts contained within the transfer box 6 centrally mounted on the chassis frame. Each propeller shaft in addition to the universal joints includes the usual splined slip joint to accommodate relative movement between the axles and chassis frame upon spring deflection. In the upper part of the transfer box 6 an input shaft is centrally positioned and universally joined to a drive shaft 7 connected to the power delivery shaft of the customary change speed gear box forming a part of the power plant.

The disposition of the several shafts contained within the transfer box 6 in relation to the parts to which they are connected is best seen in Figure 4 wherein the numeral 8 indicates the top or input shaft, the numeral 9 a countershaft, and the numerals 10 and 11 the pair of power output shafts for driving the rear axle and front axle, respectively, the shafts being driven one from the other through a train of constant mesh gears all having the same diameter and number of driving teeth. The gear 12 is rotatably mounted by suitable antifriction bearings on the forward output shaft 11 which in turn is supported through antifriction bearings in the gear box 6 with its front end projecting forwardly of the box and having splined thereon the hub 13 of the universal joint connecting with the propeller shaft 4. The gear 12 on its forward face carries a series of internal clutch teeth for engagement with the external teeth on the sliding clutch 14 keyed or splined on the shaft 11 for detachably coupling the shaft and gear together. An operating fork 15 engages within an annular groove in the slider 14 and is fixed to a shift rail 16 projected through the front wall of the casing 6 and connected by a link 17 to a shift lever 18 within convenient reach of the operator. The gear 12 is in constant mesh with the gear 19 fixed, as by means of a tapered spline or the like, on the rearward output shaft 10 which is supported in antifriction bearings in the casing 6 and projects through the rear wall for splined connection with the universal joint hub 20 associated with the propeller shaft 5. The drive from the gear 19 fixed on the rearward output shaft to the gear 12 clutchable to the forward output shaft effects rotation of the propeller shafts 4 and 5 in opposite directions so that both sets of hypoid gearing are simultaneously driven through their contacting tooth faces designed to take forward drive thrust.

The gear 19 in turn is geared to the gear 21 for the rotation of both in the same direction, through the intermediate gear 22 in constant mesh with both gears 19 and 21. This gear 22 is fixed on the countershaft 9 whose opposite ends are rotatably mounted in antifriction bearings carried by the front and rear walls of the housing 6 and which shaft also has fixed in spaced relation to the gear 22 a low speed gear 23. The teeth of the gear 23 are adapted to be engaged by external teeth on a slider 24 splined on the input shaft 8 and which slider is also engageable with internal clutch teeth formed in the front face of the gear 21. The clutch collar 24 is slid in either direction from the neutral position shown in Figure 5, through an operating fork 25 engaging within an annular groove in the slider and being fixed on a shift rail 26 which projects through the front wall of the casing and is coupled by the link 27 with a hand shift lever 28. The input shaft 8 which is mounted in antifriction bearings carried by the walls of the housing 6 has one end projected forwardly for splined connection with the universal joint hub 29 associated with the power shaft 7.

In operation the vehicle driver through the control levers 18 and 28 selects the speed ratios in the transfer box as well as the axles to be driven. In the position of the parts illustrated in Figure 5 the power transmitting mechanism is in neutral or in a non-drive relation. If all four wheels are to be driven the slider 14 is shifted rearwardly into clutching engagement with the forward drive gear 12. Sliding the clutch 24 rearwardly into coupled relation to the gear 21 will enable power from the input shaft 8 to be transmitted through the several gears in direct drive ratio to both the front and rear axles. Sliding the collar 24 forward into mesh with the gear 23 will transmit the power from the input shaft 8 in a lower ratio from the countershaft gear 22 to the gears 19 and 12. For either gear setting the clutch 14 may be disconnected so that only the rear axle is driven.

For a six wheel drive vehicle the same gear box and train of gears may be employed except a modified form of input shaft as per Figure 7 will be substituted. In this case the input shaft 8a is piloted in the front of the gear 21a which replaces the gear 21 and has formed integral thereon a rearwardly projecting shaft 30 mounted in antifriction bearings in the rear wall of the casing 6 and joined through the brake drum 31 to a propeller shaft 32 which as seen in Figure 3 extends rearwardly above the propeller shaft 5 leading to the forward rear axle 2 and is joined to the centrally located pinion shaft of the conventional hypoid geared rearmost rear axle 2a. The brake drum 31 is provided with a contracting brake band 33 of a well known type. The construction is otherwise as before described as is also the selection of speeds and the optional drive in either speed of all three axles or two rear axles only. If desired, the low speed ratio can be varied by using different numbers of teeth on the reduction gears.

In the event a four wheel drive vehicle is to be provided with an electric generator, a machine shop or the like, a power take-off mechanism may be associated with the input shaft as seen in Figure 8. The transfer box again is identical to that shown in Figure 5 except that the input shaft indicated at 8b is provided with a rearwardly extending stub 34 on which is splined a clutch sleeve 35 secured by a pin 36. Engageable with the clutch sleeve 35 is a sliding clutch element 37 splined on the power take-off shaft 38 bearing in an adapter or accessory housing 39 which is bolted to the transfer box 6. The sliding clutch 37 is provided with an annular groove to receive the shifter fork 40 mounted on a slide rail 41 arranged to be linked to a suitable control lever. For normal vehicle operation the clutch 37 will be in the neutral position shown in Figure 8 but in the event the power take-off is to be employed the selector clutch 24 contained within the transfer case is moved to its neutral position and the clutch 37 is shifted to couple the input shaft with the power take-off shaft 38.

I claim:

1. In a power driven vehicle, a pair of hypoid gear driven axles, having interchangeable pinions and ring gears and being arranged one upside down in relation to the other with their pinion shafts extending toward one another and with one pinion shaft above its ring gear axis and the other below its ring gear axis for drive rotation in opposite direction relative to each other and for the transmission of power through the forward thrust faces of both thereof, a power divider including two shafts arranged to be driven simultaneously in opposite directions and drive transmitting connection between one of said shafts and one of the axle pinions and between the other of said shafts and the other of the axle pinions.

2. In a power driven vehicle having a plurality of drive axles, a power divider including an input shaft having a driving gear, a countershaft gear rotatable on an axis spaced from the axis of and in mesh with the input shaft gear, a first output shaft gear in mesh with the countershaft gear for drive in the direction of rotation of the input shaft and drive connected to one of said axles and a second output shaft gear driven from the first output shaft gear in a direction opposite to the direction of rotation of the input shaft and drive connected to another of said axles.

3. In a power driven vehicle having a plurality of drive axles, a power divider including an input shaft having a driving gear thereon, a countershaft having its axis offset from the axis of the input shaft and carrying a gear driven from the driving gear in a counter-direction, a first output shaft gear driven from the countershaft gear in the direction of rotation of the input shaft and drive connected to one of said axles and a second output shaft gear driven from the first output shaft and drive connected to another of said axles and means operable to render ineffective the drive through the second output shaft.

4. In a power driven vehicle having a plurality of drive axles, a power divider including an input shaft, a gear rotatably mounted on said shaft, a shifter gear slidably splined on the shaft and arranged for selective clutching engagement with the first mentioned gear, a countershaft having a gear fixed thereon in constant mesh with the first mentioned gear and a second gear fixed thereon for selective drive engagement by said shifter gear, a first output shaft having a gear fixed thereon in constant mesh with one of the gears on the countershaft, a second output shaft having a gear rotatably mounted thereon in constant mesh with the gear fixed on the first output shaft and a sliding clutch splined on the second output shaft for detachably coupling the shaft and its rotatably mounted gear.

5. In a power driven vehicle having a plurality of drive axles, a power divider including an input shaft, a gear rotatably mounted on said shaft, a shifter gear slidably splined on the shaft and arranged for selective clutching engagement with the first mentioned gear, a countershaft having a gear fixed thereon in constant mesh with the first mentioned gear and a second gear fixed thereon for selective drive engagement by said shifter gear, a first output shaft having a gear fixed thereon in constant mesh with one of the gears on the countershaft, a second output shaft having a gear rotatably mounted therein in constant mesh with the gear fixed on the first output shaft, a sliding clutch splined on the second output shaft for detachably coupling the shaft and its rotatably mounted gear and a third output shaft in axial alignment with the input shaft and arranged to be driven from the gear rotatably mounted on the input shaft.

6. In a power driven vehicle, an engine driven shaft located in the forward portion of the vehicle on the approximate longitudinal center line of the vehicle, a rear drive axle having a forwardly projecting pinion shaft located in substantially the longitudinal vertical plane of the engine driven shaft, a front drive axle having a rearwardly projecting pinion shaft offset transversely of the engine driven shaft and arranged for rotation opposite to the direction of rotation of the rear axle pinion shaft, a power divider between the axles, including an input shaft axially aligned with and driven from the engine driven shaft, a pair of transversely spaced oppositely rotatable output shafts for connection with the front and rear axle pinion shafts, respectively, and arranged with the rearward output shaft below and in the vertical plane of the input shaft, intermeshing gears on the two output shafts and a countershaft gear meshing with the gear on the rearward output shaft and with a gear on the input shaft.

7. In a power driven vehicle having a plurality of drive axles, a power divider comprising an input shaft, a countershaft arranged to be geared with the input shaft, a pair of output shafts arranged to be geared to each other for rotation in opposite directions with one thereof geared to said countershaft and an output shaft in axial alignment with said input shaft and arranged to be driven therefrom.

8. In a power driven vehicle having a plurality of drive axles, a two speed power divider therefor comprising a pair of output shafts geared to one another for rotation in opposite directions and drive connected, respectively, with forward and rearward drive axles, a countershaft geared to one of said output shafts, a third output shaft geared to the countershaft and drive connected with a third drive axle, an input shaft axially aligned with said third output shaft, a slider element on the input shaft clutchable with the third output shaft gear for transmission of drive to the axles and a gear on the countershaft engageable by said slider element for drive transmission in different ratio.

9. In a transfer case of the character described, an input shaft having a slider clutch slidable thereon and a gear rotatably mounted on the shaft and arranged for selective clutching engagement by said slider clutch, a countershaft having a pair of spaced gears fixed thereon with one thereof in constant mesh with the first mentioned gear and the other selectively engageable by said slider clutch, a pair of output shafts arranged on transversely spaced parallel axes and driven gears on said output shafts, one thereof in mesh with one of the counter gears and both in mesh with each other for drive rotation of said output shafts in opposite relative directions.

10. In a multiple drive axle vehicle, front and rear axles each having hypoid gearing of the same type and one being upside down with reference to the other with the front axle drive pinion shaft located rearwardly and above the axis of the axle and the rear axle drive pinion shaft located forwardly and below the axis of the axle, whereby power may be applied through the forward thrust faces of the hypoid gearing of both axles for forward rotation of both axles by drive rotation of one pinion shaft in a direction opposite to drive rotation of the other pinion shaft and a power divider between the axles arranged to transmit power in one direction to one axle and in the opposite direction to the other axle.

CARL J. BOCK.